Patented Aug. 21, 1951

2,565,215

UNITED STATES PATENT OFFICE 2,565,215

PREPARATION OF CARBON DISULFIDE

Hillis O. Folkins and Elmer L. Miller, Skokie, Ill., assignors to The Pure Oil Company, Chicago, Ill., a corporation of Ohio No Drawing. Application April 25, 1947, Serial No. 744,020

7 Claims. (Cl. 23—206)

This invention relates to a method of producing carbon disulfide.

This application is a continuation-in-part of our application Serial Number 576,699, filed February 7, 1945, now abandoned.

In United States Patent 2,330,934, of October 5, 1943, to Thacker, and assigned to The Pure Oil Company, there is disclosed a method of preparing carbon disulfide by reacting hydrocarbons such as methane with sulfur at temperatures of approximately 450° to 700° C. in the presence of a catalyst such as silica gel, fuller's earth, bauxite or activated alumina.

We have discovered that high yields of carbon disulfide can be obtained by reacting hydrocarbons and sulfur in the presence of synthetic silica-alumina catalysts under the conditions set forth in the aforesaid patent. We have further discovered that the activity of silica-alumina catalysts in the catalysis of the reaction between hydrocarbons and sulfur to form carbon disulfide reaches a maximum when the silica content of the catalyst is approximately 2 to 10 per cent by weight of the catalyst. Synthetic silica-alumina catalysts containing approximately 2 to 10 per cent by weight of silica are more active over the entire temperature range than activated alumina substantially free of silica and are more active than silica gel at temperatures above approximately 575° C.

An object of our invention is to provide an improved method for producing carbon disulfide.

Another object of our invention is to provide a catalyst capable of giving high yields of carbon disulfide from sulfur and hydrocarbons.

Other objects of our invention will be apparent from the following description.

In accordance with our invention, sulfur and hydrocarbons, such as methane, ethane, propane, butane or any mixture thereof and mixtures of the aforesaid hydrocarbons with olefinic hydrocarbon gases such as ethylene, propylene and butylene, are pre-heated to a temperature approximating desired reaction temperature, or somewhat higher, which may be between 450° to 700° C. and preferably from approximately 500° to 700° C. The hydrocarbon and sulfur may be separately pre-heated and then mixed. The heated mixture of hydrocarbon and sulfur is charged to a reaction zone containing synthetic silica-alumina catalyst in granular, pelleted or other comminuted form. Catalysts useful in accordance with our invention may be made by co-precipitation of silica and alumina from aqueous solutions of silicon and aluminum compounds.

Methods of preparing co-precipitated synthetic silica-alumina are set forth in United States Patents 2,283,172 and 2,283,173 of May 19, 1942, to Bates. Instead of co-precipitating the silica and alumina, the alumina may be precipitated on the silica in accordance with the methods set forth in United States Patent 2,270,090, of January 13, 1942, to Thomas, United States Patent 2,325,706, of August 3, 1943, to Phillip, and United States Patent 2,326,523, of August 10, 1943, to Connolly. We prefer synthetic silica-alumina catalysts which are substantially free from alkali metal action.

Typical of the synthetic alumina catalysts suitable for use in the process conducted according to the instant invention, are catalysts based on such materials as Alorco, a prepared activated alumina catalyst. The base material can be prepared according to the method described in United States Patent 2,390,272, of December 4, 1945, to Riesmeyer and Stowe, which method involves the acidification with acetic acid of a specially prepared sodium aluminate solution to precipitate gelatinous aluminum hydroxide. Drying of the hydroxide thus prepared causes dehydration and results in the development of active materials. Silica can be deposited on the oxide by impregnating it with a given amount of ethyl silicate and subsequently hydrolyzing the material with water. In analogous fashion, silica can also be deposited on the aluminum oxide base by hydrolysis of sodium silicate. The catalyst containing desired proportions of silica and alumina can be prepared from a solution containing a hydrolyzable silicon compound and an aluminate by acidifying to form a gelatinous precipitate consisting of aluminum hydroxide and silicic acid. Heating will dry out the materials and develop the oxides in useful form.

Other methods for preparing these catalysts may be employed. In one of these methods, the alumina base may be formed by the hydrolytic action of water on amalgamated aluminum in the presence of an organic acid, such as acetic acid. The hydrosol may be coagulated by evaporation or by the addition of ammonia or other suitable electrolyte. Methods of preparing such catalysts are set forth in United States Patent 2,345,600, of April 4, 1944, to Llewellyn Heard et. al., United States Patent 2,369,734, of February 20, 1945, to Llewellyn Heard, and United States Patent 2,371,237, of March 13, 1945, to Llewellyn Heard et. al. The silica may be incorporated into the catalyst at one of the various stages of the preparation by one of the methods described above. Thus, the silica and alumina may be cogelled or the silica may be added by impregnation of the alumina gel before or after it has been washed and dried.

Our process may be carried out at atmospheric, super-atmospheric, or sub-atmospheric pressure. Excellent results are obtained at pressures of atmospheric or slightly above. Contact between the catalyst and reactants may be effected by passing the reactants through a stationary bed of granular or pelleted catalyst; by passing the reactants through a moving bed of granular or pelleted catalyst; or by intimately mixing the reactants with powdered catalyst which remains suspended in the reaction mixture during its passage through the reaction zone and is subsequently removed from the reaction products by appropriate precipitating devices. Since the catalyst remains active for indefinite periods of time, the stationary bed type of process is the simplest and most economical.

The time of contact between reactants and catalyst is determined chiefly by the temperature of reaction. At temperatures approaching 700° C. space velocities will be high since the reaction progresses rapidly at these temperatures. At temperatures approaching 450° C. space velocities are preferably lower. By space velocity is meant the total volume of reacting gases measured at 0° C. and 760 millimeters of mercury passing through a unit volume of catalyst per hour. Good results may be obtained at space velocities of approximately 100 to 1,000, although it is to be understood that higher or lower space velocities may be used.

The sulfur and hydrocarbons to be reacted may be mixed in any desired ratio, although we prefer to mix the hydrocarbons and sulfur in a ratio approximately equal to the stoichiometric ratio required to form hydrogen sulfide and carbon disulfide. In order to react the hydrocarbons as completely as possible, a small excess, of the order of 10 to 15 per cent, of sulfur may be used in the reaction mixture. Excess sulfur present in the reaction products can be readily recovered by condensation and can be recycled to the process.

The reaction may be carried out isothermally or adiabatically depending upon the conditions of the reaction employed. The reaction product is separated into its components by cooling to a temperature below the vaporization point of sulfur but above the boiling point of carbon disulfide under the existing pressure in order to condense any residual sulfur. Care should be exercised to prevent the sulfur from assuming a plastic state. Cooling to approximately 140° C. will maintain sulfur in a mobile condition. Carbon disulfide may be separated from hydrogen sulfide and unreacted hydrocarbons by absorption in oil, such as kerosene or gas-oil fraction, and recovered by stripping the carbon disulfide from the absorbent oil. The carbon disulfide is then condensed and purified.

Hydrogen sulfide and hydrocarbons which are absorbed together with the carbon disulfide may be separated from the condensed carbon disulfide by distillation and may be recycled to the absorption process to avoid loss of carbon disulfide which may be contained therein. Recovery of carbon disulfide from the reaction products may be effected in accordance with the method described in United States Patent 2,330,934, cited. The carbon disulfide may be separated from slight amounts of hydrogen sulfide and other impurities by fractional distillation or by chemical methods.

The residual gas leaving the absorber in which carbon disulfide is separated from reaction products may be sent to a regeneration unit in which hydrogen sulfide is converted to sulfur by reaction with sulfur dioxide in known manner and the sulfur recovered may be recycled to the carbon disulfide reactor. If it is desired to recycle unreacted hydrocarbons to the conversion process, they may be separated by scrubbing the mixture with an aqueous solution of sodium carbonate, sodium phosphate or organic absorbent capable of absorbing hydrogen sulfide. Hydrogen sulfide may be regenerated from this treatment and recovered as sulfur in the manner outlined.

In order to demonstrate the effectiveness of synthetic alumina-silica compositions as catalysts for the preparation of carbon disulfide, a series of runs was made in laboratory apparatus in which the reactor consisted of a vertical piece of 25–20 chrome-nickel cylindrical steel pipe, 6¾ inches in length and 2 inches in outside diameter. The reactor was well insulated and was heated by electric resistance coils. It was equipped with a thermocouple well extending axially, the length of the reactor. The reactor had a catalyst capacity of 200 cc. The runs were all made using methane as charging stock with a sulfur to methane ratio of 2, calculated on the basis of diatomic sulfur. Sulfur was charged to a pre-heating coil in a molten state by means of an accurate sulfur feed pump. Methane after being pre-heated to the desired reaction temperature in a separate pre-heater, was mixed with the sulfur. The mixture entered the top of the reactor filled with catalyst and left the reactor at the bottom thereof. The reaction mixture was cooled to 140° C. to condense sulfur. The carbon disulfide was thereafter condensed by passing the reaction products through a Dry Ice trap.

The results on the series of runs using different catalysts, all carried out at a space velocity of 389 and with a sulfur ($S_2$) to methane ratio of 2, are tabulated in the following table:

*Table*

| Catalyst | SiO$_2$, Per Cent Weight | Per Cent Conversion at— | | | |
|---|---|---|---|---|---|
| | | 525° | 550° | 575° | 600° |
| Pellets: | | | | | |
| G. C.[1] 1-3080-19 | 0.0 | 30.4 | 49.4 | 67.2 | 81.8 |
| G. C.[1] 3-2926-23 | 5.1 | 37.0 | 53.5 | 71.4 | 88.0 |
| G. C.[1] 4-2926-25 | 32.9 | 32.9 | 48.6 | 65.5 | 81.2 |
| G. C.[1] 5-2926-26 | 85.5 | 22.0 | 39.5 | 56.8 | 72.1 |
| G. C.[1] 6-2926-27 | 97.1 | 24.2 | 41.7 | 59.0 | 73.6 |
| Granular: | | | | | |
| Silica Gel | 100.0 | 54.6 | 70.7 | 83.4 | 90.3 |
| Alorco, H-40, R-2200 | 5.9 | 46.1 | 66.2 | 83.6 | 93.2 |
| Alorco, F-10 | <0.1 | 28.1 | 48.5 | | 86.6 |
| Alorco, F-1 | <0.1 | 33.6 | 54.3 | 70.7 | 87.0 |
| Nalco (U. O. P.) Type | Approx. 87.0 | 47.4 | 66.8 | | 88.5 |
| Bead, S. V.[2] 117,040 | Approx. 91.0 | 40.7 | 56.5 | | 80.5 |

[1] General chemical.
[2] Socony-Vacuum.

It will be seen from the results in the table that at temperatures up to 575° C. silica gel is the most active catalyst. Below 575° C., Alorco containing 5.9 per cent of silica, an activated alumina manufactured by the Aluminum Ore Company, is less active than silica gel, but at temperatures of approximately 575° C. and upward, Alorco containing 5.9 per cent of silica, is more active than silica gel. It is also apparent from the table that synthetic alumina-silica catalyst containing approximately 5 per cent of silica is more active over the entire temperature range than is activated alumina containing substantially no silica, or silica-alumina catalyst containing larger amounts of silica. The maximum activity occurs when the silica content of the catalyst is approximately 2 to 10 per cent by weight.

The product from each run was analyzed for carbon disulfide, hydrogen sulfide, methyl mercaptan, methyl sulfide and sulfur. In almost every case the product contained in excess of 99 per cent of carbon disulfide with hydrogen sulfide as the major impurity. For example, in a run made at 525° C. with a catalyst containing approximately 5 per cent of silica, a product was obtained containing 99.44 per cent of carbon disulfide, 0.53 per cent of hydrogen sulfide, 0.03 per cent of sulfur and no methyl mercaptan or methyl sulfide. The hydrogen sulfide can be substantially completely removed by fractional distillation.

The activity of synthetic silica-alumina catalysts increases as the silica content increases up to approximately 5–10 per cent of silica and then gradually decreases as the silica content is further increased until the silica content of the catalyst is in the neighborhood of 85–90 per cent silica. Increased activity is again apparent as the silica content approaches 100 per cent, as in the case of pure silica gel.

By utilizing synthetic alumina catalysts, particularly those in which the silica content is approximately 2 to 10 per cent by weight, carbon disulfide yields approaching very close to theoretical yields can be obtained at temperatures of 600° to 700° C.

It is claimed:

1. The method of preparing carbon disulfide comprising contacting hydrocarbon gas rich in methane and sulfur in approximately the stoichiometric ratio required for formation of hydrogen sulfide and carbon disulfide with a synthetic silica-alumina catalyst consisting essentially of about 2 to 10 per cent by weight of silica on alumina at a temperature of approximately 575° to 700° C.

2. Method in accordance with claim 1 in which the catalyst contains not more than approximately 6 per cent by weight of silica.

3. Method in accordance with claim 1 in which the catalyst contains approximately 5 per cent by weight of silica.

4. The method of preparing carbon disulfide comprising contacting a mixture of sulfur and hydrocarbon gas rich in methane at a temperature of approximately 575° to 700° C. with a synthetic silica-alumina catalyst consisting essentially of about 2–10 percent by weight of silica and the balance alumina.

5. Method in accordance with claim 4 in which the sulfur is present in the mixture in an amount equivalent to about 10 to 15% in excess of the stoichiometric amount required.

6. Method in accordance with claim 5 in which the catalyst is coprecipitated silica-alumina.

7. Method in accordance with claim 5 in which the catalyst is alumina impregnated with silica.

HILLIS O. FOLKINS.
ELMER L. MILLER.

REFERENCES CITED

The following references are of record in the file of this patent:

UNITED STATES PATENTS

| Number | Name | Date |
|---|---|---|
| 2,330,934 | Thacker | Oct. 5, 1943 |
| 2,369,377 | Thacker | Feb. 13, 1945 |